(12) United States Patent
Scott

(10) Patent No.: US 10,494,283 B2
(45) Date of Patent: Dec. 3, 2019

(54) BARNACLE SUPPRESSION MODULE

(71) Applicant: Bentley N. Scott, Garland, TX (US)

(72) Inventor: Bentley N. Scott, Garland, TX (US)

( * ) Notice: Subject to any disclaimer, the term of this patent is extended or adjusted under 35 U.S.C. 154(b) by 43 days.

(21) Appl. No.: 16/020,225

(22) Filed: Jun. 27, 2018

(65) Prior Publication Data

US 2019/0002320 A1    Jan. 3, 2019

Related U.S. Application Data

(60) Provisional application No. 62/526,638, filed on Jun. 29, 2017.

(51) Int. Cl.
| | |
|---|---|
| *C02F 9/00* | (2006.01) |
| *B63J 2/02* | (2006.01) |
| *B63J 4/00* | (2006.01) |
| *C02F 1/36* | (2006.01) |
| *C02F 1/00* | (2006.01) |
| *C02F 1/32* | (2006.01) |
| *C02F 103/08* | (2006.01) |

(52) U.S. Cl.
CPC .................. *C02F 9/00* (2013.01); *B63J 2/02* (2013.01); *B63J 4/00* (2013.01); *C02F 1/001* (2013.01); *C02F 1/36* (2013.01); *C02F 1/32* (2013.01); *C02F 2103/08* (2013.01); *C02F 2201/3222* (2013.01); *C02F 2201/3226* (2013.01); *C02F 2303/04* (2013.01); *F25B 2339/047* (2013.01)

(58) Field of Classification Search
USPC ................................ 250/432 R, 436, 455.11
See application file for complete search history.

(56) References Cited

U.S. PATENT DOCUMENTS 7,659,980 B1 *   2/2010   Mitchell ............ G01N 21/4785
                                                         356/338

* cited by examiner

*Primary Examiner* — Kiet T Nguyen

(57) ABSTRACT

A module for preventing barnacle formation in a marine air-conditioning system. The module comprises: i) a housing; ii) a source of irradiating light disposed in the housing, the irradiating light suitable for killing or stunning barnacle larvae; iii) a circuit assembly disposed in the housing and configured to receive electrical power from an external power supply and to provide electrical power to the source of irradiating light; and iv) a transparent window disposed in the housing to permit the irradiating light to pass therethrough. The housing is adapted to be coupled to a water filter supplying raw water to the marine air-conditioning system such that the irradiating light is transmitted into the raw water in the water filter.

8 Claims, 10 Drawing Sheets

BARNACLE SUPPRESSION MODULE

CROSS-REFERENCE TO RELATED APPLICATION(S) AND CLAIM OF PRIORITY

The present application is related to U.S. Provisional Patent Application No. 62/526,638, filed Jun. 29, 2017 and entitled "Barnacle Suppression Module". Provisional Patent Application No. 62/526,638 is assigned to the assignee of the present application and is hereby incorporated by reference into the present application as if fully set forth herein. The present application hereby claims priority under 35 U.S.C. § 119(e) to U.S. Provisional Patent Application No. 62/526,638.

TECHNICAL FIELD

The present application relates generally to a module for suppressing barnacle growth in a marine air conditioning unit.

BACKGROUND

The marine industry implements a wide variety of systems directed to controlling the growth of barnacles on marine surfaces, including the use of bottom paints, electrodes, and ultrasonic systems. Each of these systems and methods has specific advantages and disadvantages.

Patent Publication No. PCT/AU2005/001676 describes a method to introduce swept ultra-sound waves into a marine surface in order to form waves of compression and expansion, thereby creating microscopic bubbles. These bubbles collapse quickly causing a high temperature which breaks down the shell of most organisms. However, implementing such a system to remove barnacles across a hull is not a simple or energy efficient method.

U.S. Pat. No. 5,735,226 describes an array of transducers generating an ultrasonic signal. This is swept and received to enhance the ultrasonic energy generated. The array of transducers is placed on the hull to inhibit the growth. This is expensive and difficult to overcome the structural configuration impact on ultrasonic energy. U.S. Pat. No. 4,058,075, entitled "Marine Life Growth Inhibitor Device", describes an acoustical vibration device in which a plurality of speakers located around the inside of the boat hull is used to inhibit the growth of marine life. The larger and more dense the vessel, the more difficult this would be to implement. U.S. Pat. No. 3,650,924 proposes heating the bottom of the vessel to inhibit growth. This would not be practical due to the amount of energy required.

U.S. Pat. Nos. 3,661,742 and 3,650,924 describe methods to inhibit the attachment of marine organisms through cathodic protection. Toxic ions are forced into solution in the seawater used to cool or contain the vessel. There are many systems implemented in this fashion but none are simple to implement within the vessel interior spaces. U.S. Pat. No. 3,837,916 proposes spraying fresh water to prevent attachment of marine microorganisms. This is not practical, as the source of fresh water in a salt water environment is limited.

U.S. Pat. Nos. 5,308,505 and 5,322,569 describe an ultraviolet light system which irradiates the water underneath the vessel and adjusts the intensity to kill barnacle larvae to prevent their attachment to the underwater surface. Another implantation of this system shows that the water is passed through a biocidal chamber with UV light of specific intensity for at least one minute exposure time. These patents do not describe or implement a system that fits within existing marine systems.

Commercially available systems include: i) Shanghai Cyeco Environmental Technology Marine Growth Preventing System, which makes an electrode based system; ii) Cathelco Limited, which makes electrode protection system; iii) UltraSonic Antifouling, Ltd., which makes an ultrasonic systems; and iv) Spectra Watermakers, which makes a passive copper anode system.

Therefore, there is a need for improved systems for controlling barnacle formation and growth in marine environments.

SUMMARY

To address the above-discussed deficiencies of the prior art, it is a primary object to provide a module for preventing barnacle formation in a marine air-conditioning system. In an advantageous embodiment, the module comprises: i) a housing; ii) a source of irradiating light disposed in the housing, the irradiating light suitable for killing or stunning barnacle larvae; iii) a circuit assembly disposed in the housing and configured to receive electrical power from an external power supply and to provide electrical power to the source of irradiating light; and iv) a transparent window disposed in the housing to permit the irradiating light to pass therethrough. The housing is adapted to be coupled to a water filter supplying raw water to the marine air-conditioning system such that the irradiating light is transmitted into the raw water in the water filter.

In one embodiment, the housing has a threaded surface such that the housing may be screwed into an opening in the water filter.

In another embodiment, the housing is adapted to be inserted into a transparent cap associated with the water filter.

In still another embodiment, the housing is adapted to be attached to the water filter such that the irradiating light is transmitted through a transparent wall of the water filter.

In yet another embodiment, the module further comprises an ultrasonic transducer disposed in the housing and configured to transmit ultrasonic energy into the water filter.

In a further embodiment, the source of irradiating light generates ultraviolet light.

In a still further embodiment, the source of irradiating light generates laser light.

In a yet further embodiment, the source of irradiating light comprises light emitting diodes.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged marine air-conditioner condenser cooling coil systems.

Figure 1A:
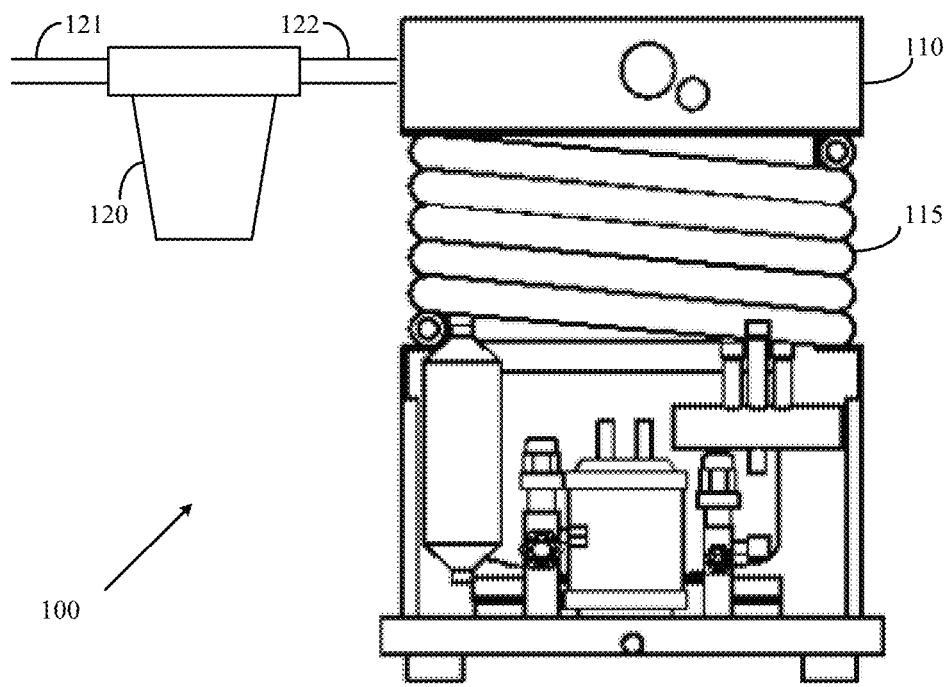
FIGS. 1A and 1B illustrate a typical marine air-conditioning system according to an embodiment of the prior art.
Figure 1B:
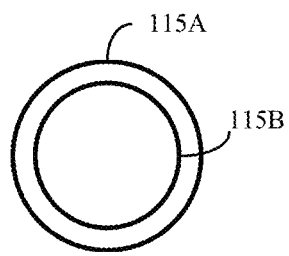

FIGS. 1A and 1B illustrate conventional marine air-conditioning (A/C) system 100, which includes conventional compressor components. In marine air-conditioning system 100, the condenser coil is cooled using seawater that may contain barnacle larvae. In other environments, fresh water may be used to cool a condenser coil. For the purposes of simplification and clarity in explaining the operation of air-conditioning system 100, it shall be assumed hereafter that seawater is used to cool the condenser coils.

Marine air-conditioning system 100 comprises frame 110, which supports condenser coil 115, and other A/C components (e.g., compressor, evaporator, fan, etc.). Seawater is fed to condenser coil 115 through water filter (or strainer) 120 and pipes 121 and 122. The seawater originates from under the vessel hull, passes through filter 120, then through a centrifugal pump and then into condenser coil 115. FIG. 1B is a cross-sectional view of condenser coil 115. Condenser coil 115 comprises inner copper tube 115B, which is inside of larger, outer copper tube 115A. Inner tube 115B contains the hot, high-pressure Freon gas that is cooled by the seawater that is in the gap between inner copper tube 115B and outer copper tube 115A. The heat from the Freon is transferred to the raw seawater passing through the gap, thereby cooling the Freon gas and condensing it to liquid.

Figure 2A:
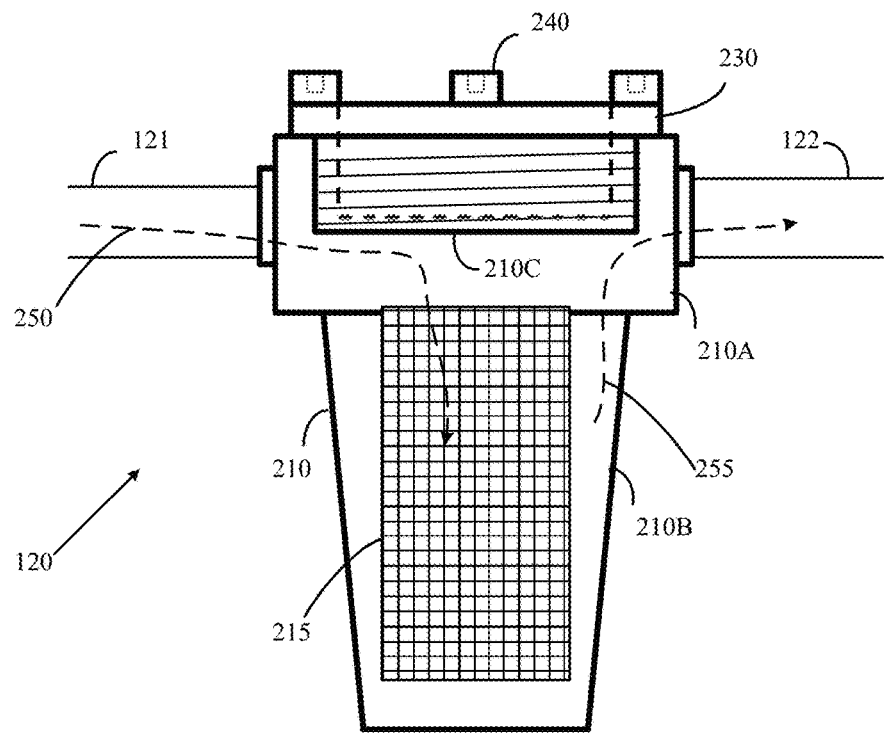
FIGS. 2A and 2B illustrate a typical marine AC cooling water filter (or strainer) according to an embodiment of the prior art.
Figure 2B:
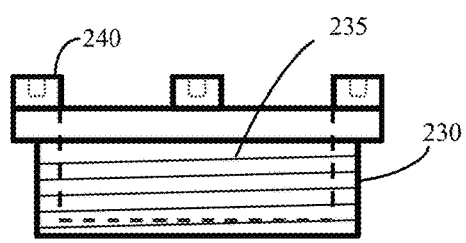

FIGS. 2A and 2B illustrate a cross-sectional view of conventional marine A/C cooling water filter (or strainer) 120. Gross Mechanical Laboratories, Inc. ("GROCO") makes numerous such filters. Filter 120 comprises chamber 210 and hand-screwed cap 230. In an exemplary embodiment, cap 230 may be made of clear plastic and chamber 210 may comprise upper brass body 210A and clear plastic lower body 210B. Chamber 210 holds plastic (or metal) mesh basket 215, which is inserted into the center portion of chamber 210 through top opening 210C in upper brass body 210A. Cap 230 comprises threaded surface 235 that screws into the threaded inner surface of top opening 210C. Cap 230 may be finger-tightened into place using raised bumps 240 on the top of cap 230. The dotted line in FIG. 2B indicates an exemplary embodiment in which cap 230 includes a hollow center.

Mesh basket 215 filters any material coming in with the raw seawater. Upper brass body 210A has an inlet opening fluidly coupled to pipe 121 and an outlet opening fluidly coupled to pipe 122. The internal ducts/lumens (not shown) of upper brass body 210A force the incoming seawater from pipe 121 down into the center of mesh basket 215 (as indicated by dotted line 250). The strained seawater is then forced through mesh basket 215 into the outer portion of chamber 210. The internal ducts/lumens of upper brass body 210A then force the outgoing strained seawater into pipe 122 (as indicated by dotted line 255).

Barnacle larvae and algae may be too small to be captured by mesh basket 215. This may allow the formation of barnacles on mesh basket 215 itself, the inner surface of chamber 210, and the inside of condenser coil 215. Barnacles that form in the air-conditioning condensation coils may become lodged there and grow, thereby reducing the cooling efficiency and blocking the seawater flow. To prevent this from occurring, the present disclosure describes a module comprising a light source and/or ultrasonic wave source that may be used to kill, stun, or otherwise neutralize the barnacle larvae and/or algae as larvae and algae pass through filter 120. The light source may be an ultraviolet (UV) light source or laser light source that produces light of sufficient power and specific wavelength to kill barnacle larvae and algae. The power levels and wavelengths of light necessary to kill barnacle larvae and algae are generally known, but may be modified in specific environments to account for the opacity of the seawater, temperature, salinity, and/or other factors.

Since all of the inlet seawater flows past screw cap 230, it would be advantageous to place the light module at that location to irradiate any barnacle larvae in the incoming seawater. In a first exemplary embodiment, the module containing the light source and (optional) ultrasonic wave source may be inserted into the hollow center of cap 230. The irradiating light and sound waves may pass through clear plastic cap 230 and kill or stun the barnacle larvae or algae. In a second exemplary embodiment, cap 230 is simply removed and replaced entirely by a threaded module that is screwed into opening 210C instead. For the purposes of simplification and clarity in explaining the operation of the module, it shall be assumed hereafter that the module is threaded and replaces cap 230.

Advantageously, the boat operator may install this module easily into the top of filter 120 and then supply the DC or AC power required. No other plumbing changes or additional in line components are required. This is important since space within a marine environment is limited and difficult to modify. In addition, other module designs may be implemented that would surround clear plastic lower body 210B with a wrap-around module or slip-on module, which may also provide additional irradiation of filtered seawater to prevent barnacle larvae growth. For example, the module may take the form of a shield or cover that encloses and attaches to clear plastic lower body 210B and that includes UV light sources and/or laser light sources on its inner surface in order to shine irradiating light through clear plastic lower body 210B.

Figure 3A:
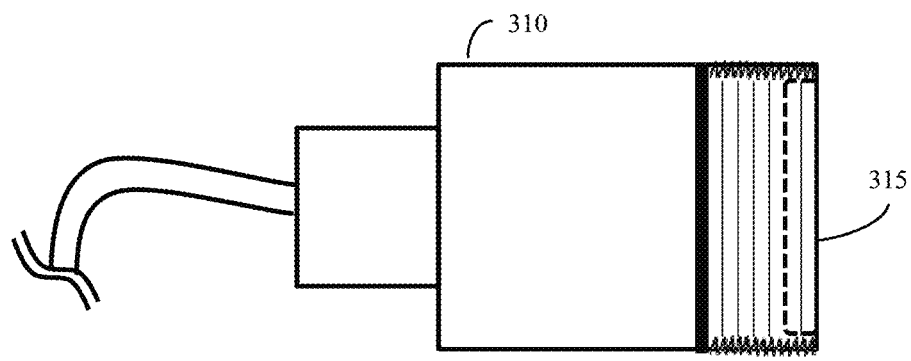
FIGS. 3A and 3B illustrate a barnacle module that contains the ultraviolet sources according to an exemplary embodiment of the disclosure.
Figure 3B:
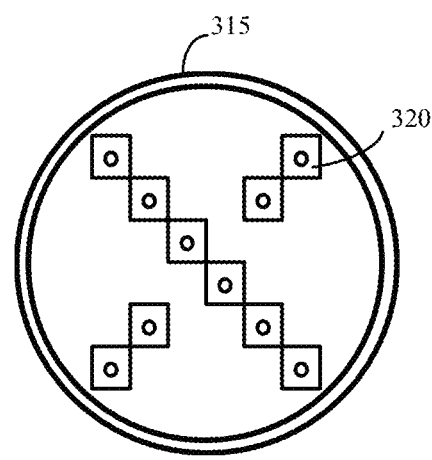

FIGS. 3A and 3B illustrate barnacle module 310, which includes a source of ultraviolet light. Barnacle module 310 includes threaded end 315 that may be screwed into top opening 210C in upper brass body 210A. Module 310 may include a watertight, transparent window (or lens) proximate threaded end 315 and, for example, a plurality of light emitting diodes (LEDs), such as exemplary LED 320, that transmit ultraviolet (UV) light through the transparent window and into the seawater in filter 120. An external power cord supplies power to the LEDs and over-voltage protection and driver circuits (not shown) in module 310. The glass window (or an appropriate transparent epoxy coating) prevents seawater from reaching the circuits in module 310. An O-ring groove may be included for sealing module 310 to the strainer cap when mounted in this configuration.

FIG. 3A also illustrates a recess (see dotted line) for LED sealing epoxy. This recess allows the mounting of the LEDs on a substrate and provides an area for epoxy or O-ring sealing.

Figure 4A:
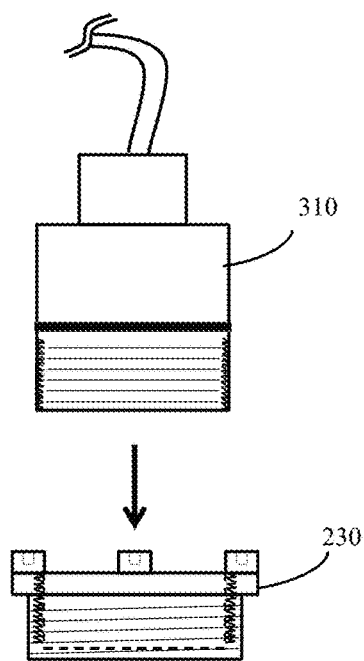
FIGS. 4A and 4B illustrate an ultra-violet barnacle module attached to a marine filter cap according to an exemplary embodiment of the disclosure.
Figure 4B:
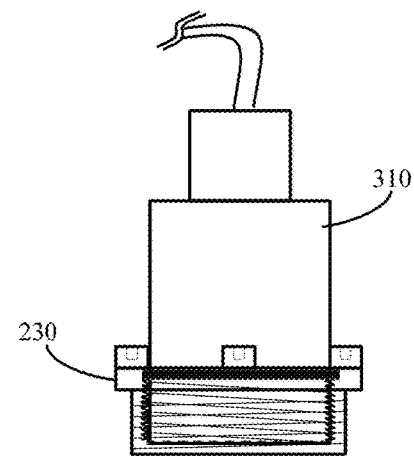

FIGS. 4A and 4B illustrate an embodiment in which ultra-violet barnacle module 310 may be inserted into filter cap 320. Since cap 320 is transparent, this would achieve the same effect as if cap 320 was omitted and module 310 was screwed directly into top opening 210C in upper brass body 210A.

Figure 5:
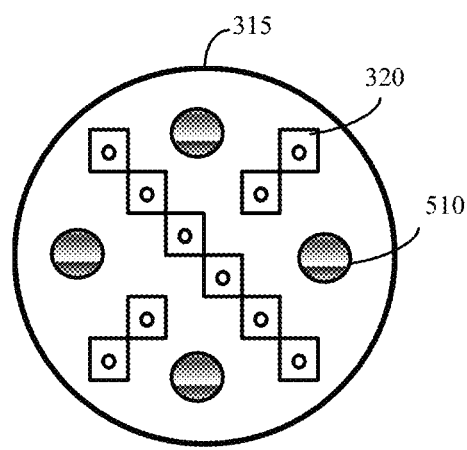
FIG. 5 illustrates a barnacle module with laser modules according to an exemplary embodiment of the disclosure.

Other options for the UV sources may include an array of laser diode modules embedded within barnacle module 310. FIG. 5 illustrates barnacle module 310, which includes UV LEDs 320 and further includes a plurality of laser diode modules 510. Laser diode modules 510 may be used instead of or in conjunction with the UV LEDs 320. Additionally, laser modules 510 may be used to clean off the algae and other contaminants from the transparent window of barnacle module 310 or the inside surface of cap 230.

Figure 6:
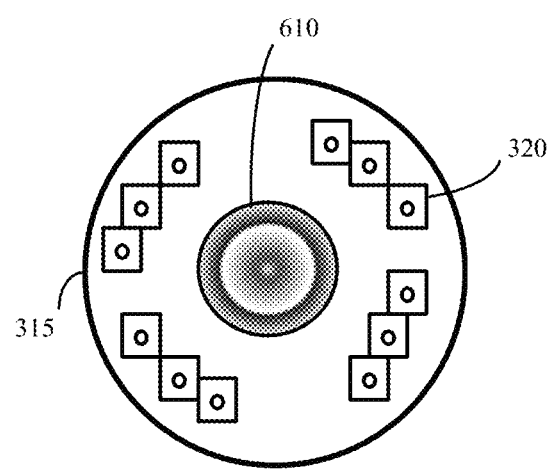
FIG. 6 illustrates a barnacle module with UV LED and ultrasonic transducer according to an exemplary embodiment of the disclosure.

FIG. 6 illustrates barnacle module 310, which includes UV LED 320 and ultrasonic transducer module 610. Embedded ultrasonic transducer module, in conjunction with UV light sources may also reduce the accumulation of algae and other particulates on the transparent window of barnacle module 310 or the inside surface of cap 230.

Figure 7:
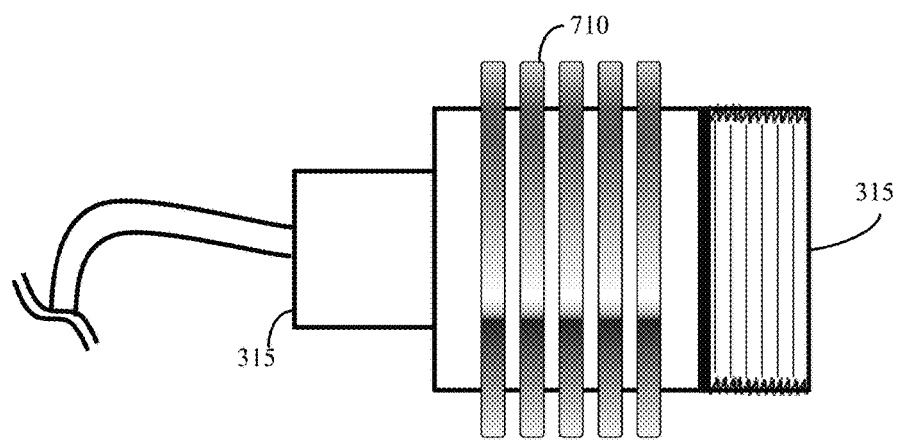
FIG. 7 illustrates a barnacle module with cooling fins according to an exemplary embodiment of the disclosure.

FIG. 7 illustrates barnacle module 310, which further includes a plurality of cooling fins 710. The working temperature of barnacle module 310 may depend upon its location within the marine environment and the temperature of the water passing through filter 120. Therefore, it may be necessary to mount cooling fins 710 on module 310 to assure long term reliability.

Figure 8:
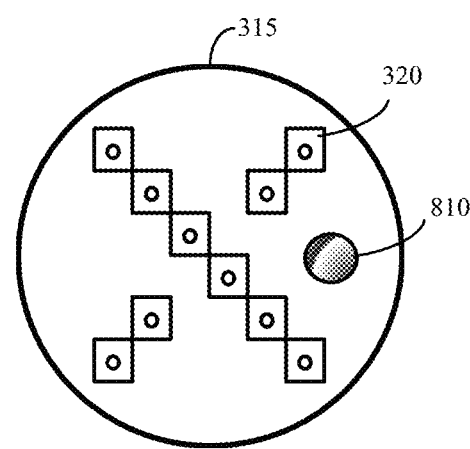
FIG. 8 illustrates a barnacle module with an optical sensor according to an exemplary embodiment of the disclosure.

FIG. 8 illustrates barnacle module 310, which further includes optical sensor 810. Since the inner surface of cap 230 or the transparent window of module 310 may cloud up with algae and other particulates, optical sensor 810 may be used to provide a signal or light to alert the boat operator to clean the window or cap 230. Sensor 810 may be an infrared or other appropriate source with an appropriate optical path selected by angles and/or a combination of optics to visually determine the opaqueness of the window. Advantageously, sensor 810 may be used to trigger the cleaning of cap 230 or the window of module 310 by use of ultrasonic transducer module 610 or laser modules 510, as described above.

Figure 9:
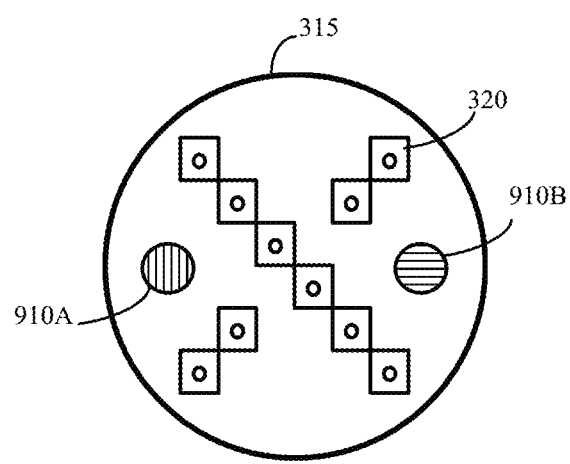
FIG. 9 illustrates a barnacle module with a second wavelength and an optical sensor with a filter according to an exemplary embodiment of the disclosure.

FIG. 9 illustrates barnacle module 310, further including a second optical sensor 910A and 910B operating at a second wavelength. The second sensor increases the ability to sense the opaqueness of cap 230 or the window in module 310.

Figure 10:
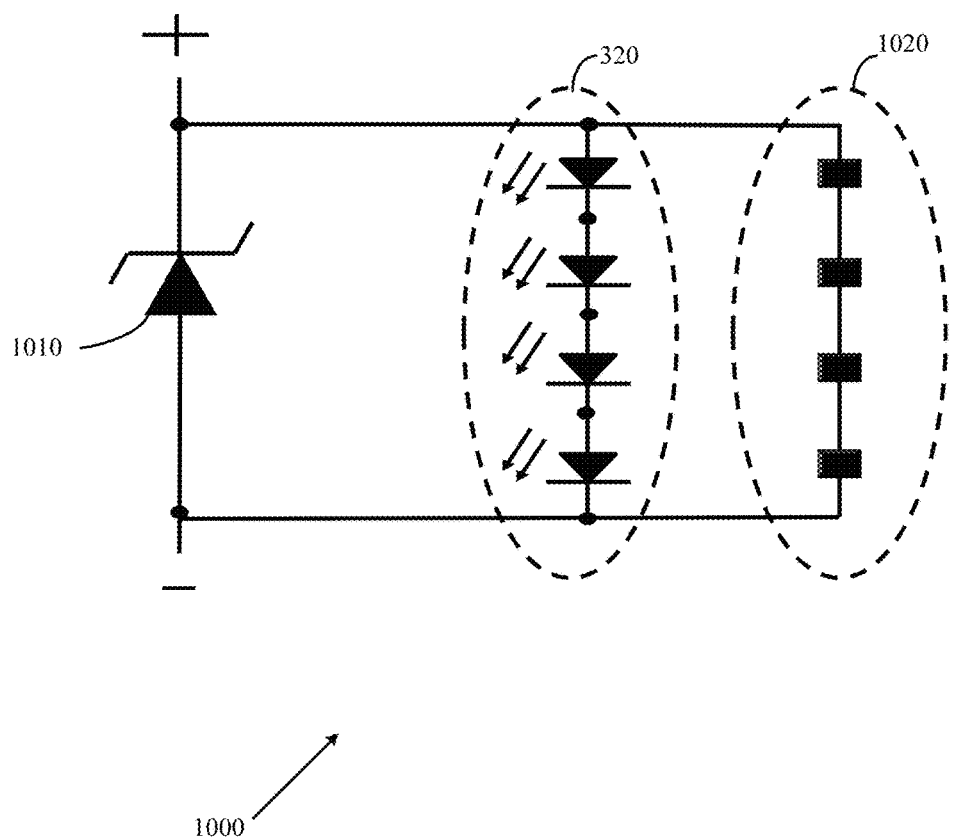
FIG. 10 illustrates a barnacle module circuit protection system according to an exemplary embodiment of the disclosure.

FIG. 10 illustrates circuit protection system 1000 in barnacle module 310. The circuit protection system may comprise reverse or over-voltage protection Zener diode 1010 which protects the plurality of light emitting diodes (LEDs) 320 and may further include open-circuit protection system 1020, such as those by Littelfuse PLED protection devices.

In the above-described embodiments, the housing of module 310 may made of navy bronze in order to better heat sink the power from the UV LEDs. In the above-described embodiments, the space between the LEDs and the glass/plastic window of module 310 may be filled with an optical oil to assist in the transference of the optical energy. This may be temperature compensated by use of a capillary or bladder structure. In the above-described embodiments, the power to the LEDs may be pulsed to lower the total power usage and increase the lifetime of the LEDs.

Although this disclosure primarily addresses the filter or strainer for an air-conditioning seawater (or freshwater) cooling system, it may also be used in filters or strainers for the engines, generator and other systems on board a marine environment.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A module for preventing barnacle formation in a marine air-conditioning system, the module comprising:
    a housing;
    a source of irradiating light disposed in the housing, the irradiating light suitable for killing or stunning barnacle larvae;
    a circuit assembly disposed in the housing and configured to receive electrical power from an external power supply and to provide electrical power to the source of irradiating light; and
    a transparent window disposed in the housing to permit the irradiating light to pass therethrough,
    wherein the housing is adapted to be coupled to a water filter supplying raw water to the marine air-conditioning system such that the irradiating light is transmitted into the raw water in the water filter.

2. The module as set forth in claim 1, wherein the housing has a threaded surface such that the housing may be screwed into an opening in the water filter.

3. The module as set forth in claim 1, wherein the housing is adapted to be inserted into a transparent cap associated with the water filter.

4. The module as set forth in claim 1, wherein the housing is adapted to be attached to the water filter such that the irradiating light is transmitted through a transparent wall of the water filter.

5. The module as set forth in claim 1, further comprising an ultrasonic transducer disposed in the housing and configured to transmit ultrasonic energy into the water filter.

6. The module as set forth in claim 1, wherein the source of irradiating light generates ultraviolet light.

7. The module as set forth in claim 1, wherein the source of irradiating light generates laser light.

8. The module as set forth in claim 1, wherein the source of irradiating light comprises light emitting diodes.

* * * * *